J. W. SHALLENBERGER.
SECURING DEVICE FOR MINERS' DRILLS.
APPLICATION FILED SEPT. 26, 1913.
1,115,594.
Patented Nov. 3, 1914.
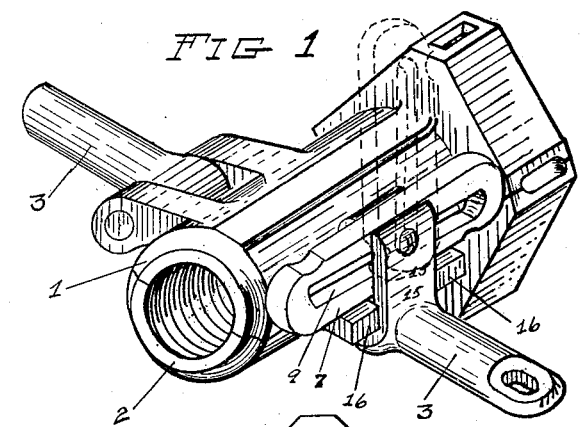
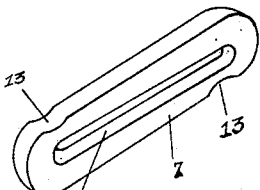
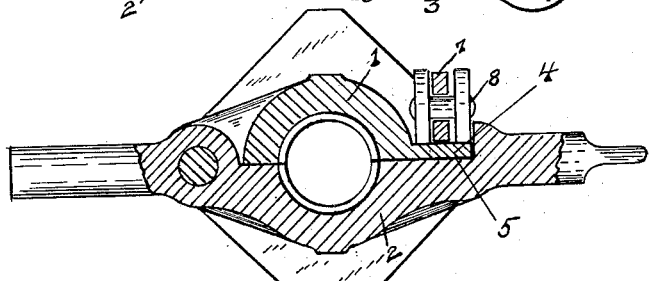
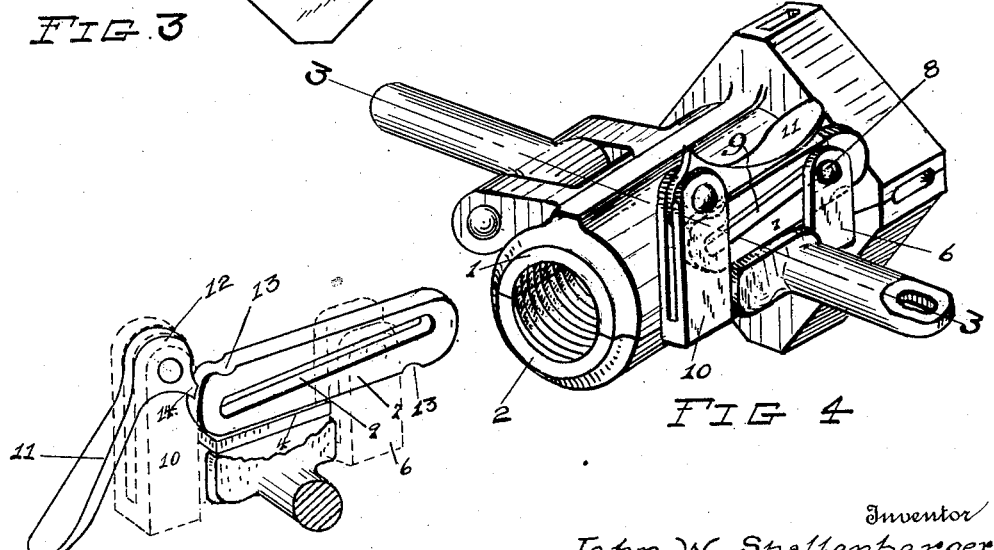
Inventor
John W. Shallenberger.

UNITED STATES PATENT OFFICE.

JOHN W. SHALLENBERGER, OF CANAL FULTON, OHIO.

SECURING DEVICE FOR MINERS' DRILLS.

1,115,594.   Specification of Letters Patent.   Patented Nov. 3, 1914.

Application filed September 26, 1913. Serial No. 791,919.

*To all whom it may concern:*

Be it known that I, JOHN W. SHALLENBERGER, a citizen of the United States, residing at Canal Fulton, in the county of Stark and State of Ohio, have invented certain new and useful Improvements in Securing Devices for Miners' Drills, of which the following is a specification.

My invention relates to improvements in securing devices for miners' drills in which the hinged members designed to be located upon the screw threaded auger shank can be securely fastened together, but in such a manner that they can be quickly and easily released and again closed and properly secured and locked in closed position.

The objects of the present invention are, first, to provide a peculiarly constructed key, and second, to provide means whereby the key can be, when desired, securely locked or clamped against endwise movement independent of friction. These objects, together with other objects readily apparent to those skilled in the art, I attain, by the construction illustrated in the accompanying drawings, but my invention may be embodied in a variety of other mechanical forms without departing from the spirit of the invention.

In the accompanying drawing—Figure 1 is a perspective view showing the members closed and secured in closed position. Fig. 2 is a detachable perspective view of the locking key. Fig. 3 is a section on line 3—3, Fig. 4, showing a slight modification from that shown in Fig. 1. Fig. 4 is a perspective view showing the hinged members in closed position, the key in position to lock the members and the key locking device, said figure being a modification of Fig. 1. Fig. 5 is a view showing a portion of one of the hinged members, the locking key showing the locking lever thrown backward or into position to move the locking key endwise, the same being a modification of Fig. 1.

Similar numerals of reference indicate corresponding parts in all the figures of the drawing.

In the accompanying drawing, 1 represents the hinged nut or clamp section, and 2 the body portion or section, which sections or parts are each provided with semicircular recesses or grooves provided with screw threads, which screw threads are formed of a size and pitch to correspond with the size and pitch of the auger shank. It will be understood that the screw threads can be cut in the hinged member or body member, or if desired fillers or linings may be employed but this is a question of judgment as either way is common and well known so far as the hinged members within themselves are concerned and so far as detailed construction is concerned with reference to the auger shank has no specific reference to my present invention. It will also be understood that the body portion of the boxing for the screw threaded auger shaft must be provided with suitable trunnions 3, by which the hinged members or boxing together with the auger and auger shank are properly supported by the usual frame or post such as commonly used in miners' drills. The hinged member 1 is provided with the lateral extended flange 4, which rests upon the ledge 5 as best illustrated in Fig. 3 when the boxing members 1 and 2 are in closed position.

Attached to the body portion 2 or formed integral therewith is the bifurcated post 6, which post is for the purpose of receiving or holding the locking key 7 by means of the cross bolt or rivet 8, which cross bolt or rivet is located through the slot 9 formed in the key 7. For the purpose hereinafter described the slot 9 is formed of a length to correspond substantially with the length of the key, said slot being formed at an angle to the outer edges of the key 7, or in other words, the slot 9 extends diagonally in a longitudinal direction with reference to the key proper, thereby providing two wedge shaped parts or portions upon opposite sides of the longitudinal slot.

In use when it is desired to hold the parts 1 and 2 in closed position and upon the auger shank, said parts or members are placed in position illustrated in Figs. 1, 3 and 4 after which the key 7 is moved endwise so as to bring the key directly over the flange 4, and as the key is moved it will be drawn downward, owing to the fact that the slot 9 is located at an angle to the length of the key, which causes the under face of the uppermost wedge portion of the key to bear upon the rivet or bolt 8, thereby causing the key to press or bear upon said flange. In some instances it may be desirable to lock the key against endwise movement and not depend entirely upon frictional contact of the key upon the flange. In order to provide for thus locking the key the body portion 2 is provided with a second bifurcated post 10, to which bifurcated post is pivoted the lever 11 the pivoted end of said lever being provided with the eccentric 12, which eccentric is for the purpose of being seated in the proper recess or groove 13 when the lever is brought into the position illustrated in Fig. 4.

In order to use the key regardless of its position as to its edges; that is to say to provide for using the key without reference to which edge is uppermost, said key is provided upon its opposite ends and edges with the recesses or grooves 13 by which arrangement the key can be inverted and placed in position to clamp the members and to be locked against endwise movement.

It will be understood that in order to lock the key 7, one end of the key must be brought under the pivotal point of the lever 11 so that the eccentric can be properly seated in one of the recesses or grooves 13, and before said key can be lifted or turned upon the rivet or bolt 8, the key must be moved endwise and in order to provide means for forcing the key endwise a sufficient distance to loosen the same so that it will be free to be moved endwise, the eccentric is provided with the short finger 14, which short finger will press or bear against the end of the key as the lever 11 is brought into the position illustrated in Fig. 5, after which the key can be easily moved endwise and turned out of the way to clear the flange 4 when the hinged member is lifted or brought into an opened position.

In some instances it may be desirable to simply hold the key by frictional contact and when it is so desired the locking member may be dispensed with and the key pivotally connected to the bifurcated post 15 and when such a construction is employed I prefer to provide two laterally extended flanges 16, said flanges being spaced from each other a sufficient distance to clear the post 15. It will be understood that when the key is used as illustrated in Fig. 1 it is not absolutely necessary to employ the recesses or grooves 13. In order to provide a key that can be locked I prefer to form the recesses or grooves 13.

It will be understood that by providing the key 7 with the slot 9 and passing the pin or bolt 8 through said slot, said pin or bolt being fixed to one of the members it is not necesssary to employ a chain to hold the device to prevent the key from becoming detached from the device, owing to the fact that regardless of the direction of movement of said key; that is to say the movement to release or the movement to lock the members, the key cannot become detached and is always in condition for use. By providing the key with the diagonal slot, it will be understood that when the key is moved in one direction, the hinged members will be locked together, and when moved in the opposite direction the hinged members will be released but regardless of the direction of the key it is never detached from its member.

When it is desired to remove the hinged members from the auger or drill shank it will be understood that said members must be separated or open in the usual manner and in order to provide for the opening of the members, the key 7 must be brought into the position illustrated in dotted lines Fig. 1 or substantially so and when the key is brought into such a position it will be of the way of the movements of the hinged members with reference to each other and the members are free to be moved upon their hinge.

Having fully described my invention what I claim as new and desire to secure by Letters Patent, is—

1. In a device of the character described, the combination of hinged members adapted to be located upon an auger shank, one of said members provided with a laterally extended flange, a key carried by the other member, said key provided with a slot extended diagonally lengthwise of the key, a bolt or rivet located through the diagonal slot and means for holding the bolt or rivet in fixed position.

2. In a device of the character described, the combination of hinged members, one of said members provided with a laterally extended flange, a key carried by the other member, said key provided with a slot located at an angle to the edges of said key, whereby either edge of the key is adapted to bear upon the laterally extended flange, and means located through the slot adapted to move said key laterally.

3. In a device of the character described, the combination of hinged members, one of said members provided with a laterally extended flange, a key carried by the other member, said key provided with a slot located at an angle to the edges of said key whereby either edge of the key is adapted to bear upon the laterally extended flange, means for locking the key against endwise movement, and means for moving the key laterally.

4. In a device of the character described, the combination of hinged members, a key carried by one of said members, said key provided with a longitudinal slot located diagonally, said slot located at an angle to the edges of the key, and means for moving the key laterally by the longitudinal movement of the key.

5. In a device of the character described, the combination of hinged members, one of said hinged members provided with a laterally extended flange, a key carried by the other member, said key provided with a slot located at an angle to the edges of said key and the key provided with recesses located upon opposite sides and ends thereof, an eccentric lever carried by the key carrying member, the eccentric of said lever adapted to be seated in one of the recesses, and means for moving the key laterally by the longitudinal movement of the key.

6. In a device of the character described, the combination of hinged members, a key carried by one of the members, said key provided with a diagonal slot and recesses, an eccentric lever pivoted to the key carrying member, the eccentric of the lever adapted to be seated in one of the recesses of the key and a finger extended from the eccentric, said finger adapted to move the key in one direction, and means for moving the key laterally by the longitudinal movement of the key.

7. In a device of the character described, the combination of hinged members, a key carried by one member and engaging the other and provided with a diagonal slot, means for moving the key longitudinally and means located through the diagonal slot adapted to move the key laterally by the longitudinal movement of the key.

In testimony that I claim the above, I have hereunto subscribed my name in the presence of two witnesses.

JOHN W. SHALLENBERGER.

Witnesses:
SYLVIA BORON,
F. W. BOND.

---

Copies of this patent may be obtained for five cents each, by addressing the "Commissioner of Patents, Washington, D. C."